(12) United States Patent
Shaw et al.

(10) Patent No.: US 6,464,306 B2
(45) Date of Patent: Oct. 15, 2002

(54) BRAKE PEDAL FEEL EMULATOR WITH INTEGRAL FORCE AND TRAVEL SENSORS

(75) Inventors: Schuyler S. Shaw; Bryan P. Riddiford, both of Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/794,673

(22) Filed: Feb. 27, 2001

(65) Prior Publication Data

US 2002/0117893 A1 Aug. 29, 2002

(51) Int. Cl.$^7$ .............................................. B60T 13/74
(52) U.S. Cl. ............................................................ 303/3
(58) Field of Search ............................... 303/3; 188/156, 188/154; 324/207.2, 207.22; 338/33 H; 74/514

(56) References Cited

U.S. PATENT DOCUMENTS 4,784,442 A * 11/1988 Peterson ....................... 303/15
4,818,036 A * 4/1989 Reinecke ...................... 188/156
5,439,275 A * 8/1995 Padula et al. ................ 188/158
6,298,746 B1    10/2001 Shaw
6,330,838 B1 * 12/2001 Kalsi ........................ 200/61.89
6,367,886 B1    4/2002 Shaw

* cited by examiner

*Primary Examiner*—Jack Lavinder
*Assistant Examiner*—C. T. Bartz
(74) *Attorney, Agent, or Firm*—Scott A. McBain

(57) ABSTRACT

A brake pedal feel emulator for a motor vehicle brake system includes a housing having a bore for supporting a first piston operably connected to a brake pedal. An elastomer spring encapsulating a magnet or magnetized by the dispersion of ferrous particles throughout the spring body is engageable by the first piston and is disposed in the emulator housing. A second piston is disposed in the housing and engaged with the elastomer spring and with a mechanical spring. Hall effect sensors mounted on the emulator housing sense changes in a magnetic field generated by the magnet to provide signals to a controller proportional to travel and force exerted on the brake pedal for use in controlling the vehicle brake system.

16 Claims, 1 Drawing Sheet

BRAKE PEDAL FEEL EMULATOR WITH INTEGRAL FORCE AND TRAVEL SENSORS

FIELD OF THE INVENTION

The present invention pertains to an emulator adapted to be operably connected to the brake pedal of a vehicle and including an elastomer spring member and Hall effect brake pedal travel and force sensors.

BACKGROUND

In the development of electrically controlled brake systems for wheeled vehicles and the like, it has been deemed necessary to develop emulators which provide the "feel" of conventional brake pedals for brake systems of the prior art. In particular, for automobile brake systems, it has been deemed desirable to provide a brake pedal emulator which will provide to the vehicle operator the same feel or resistance to movement of the brake pedal as the operator is used to experiencing with a conventional hydraulic brake system. In this regard, elastomer spring type pedal feel emulators have been developed. However, electrically controlled brake systems also require signals related to the forces exerted on the brake pedal and pedal travel distance so as to provide suitable signals used for actuating the braking systems.

Externally mounted braking force and brake pedal travel sensors further complicate electrically controlled braking systems. With the development of elastomer spring based emulators for creating a suitable feel or sensation related to the force and travel of a brake pedal, it has been deemed desirable to use the basic concept of such an emulator to include brake pedal force and brake pedal travel sensors or signal generators operable to provide signals useful for certain electrically controlled brake systems. Accordingly, integration of force and travel sensors into a brake pedal emulator is considered desirable and it is to these ends that the present invention has been developed.

SUMMARY OF THE INVENTION

The present invention provides an improved brake pedal emulator for a motor vehicle brake system.

In accordance with one aspect of the invention a brake pedal "feel" emulator is provided which includes an elastomer spring interposed first and second pistons disposed in an emulator cylinder housing. The elastomer spring advantageously encapsulates or comprises one or more magnets for generating magnetic fields which are sensed by separate sensors. The sensors are operable to generate electrical signals related to changes in the intensity and/or direction of the magnetic fields to provide signals to a brake control system which are related to the braking effort applied to the vehicle brake pedal by the vehicle operator.

In accordance with another aspect of the invention a brake pedal feel emulator is provided which includes a Hall effect sensor for sensing brake pedal travel and for communicating signals to a signal conditioning circuit and a controller. Still further, the invention provides a brake pedal feel emulator which includes a second Hall effect sensor for providing signals proportional to the force applied to the brake pedal and the emulator. Signals generated by both Hall effect sensors are transmitted to signal conditioning circuits and to a controller for controlling actuation of a vehicle brake system.

Those skilled in the art will further appreciate the above noted advantages and superior features of the invention together with other important aspects thereof upon reading the detailed description which follows in conjunction with the drawing.

BRIEF DESCRIPTION OF THE DRAWING

The single drawing FIGURE illustrates the brake pedal feel emulator of the present invention in a central longitudinal cross section view and in somewhat schematic form.

DETAILED DESCRIPTION OF A PREFERRED EMBODIMENT

Figure 1:
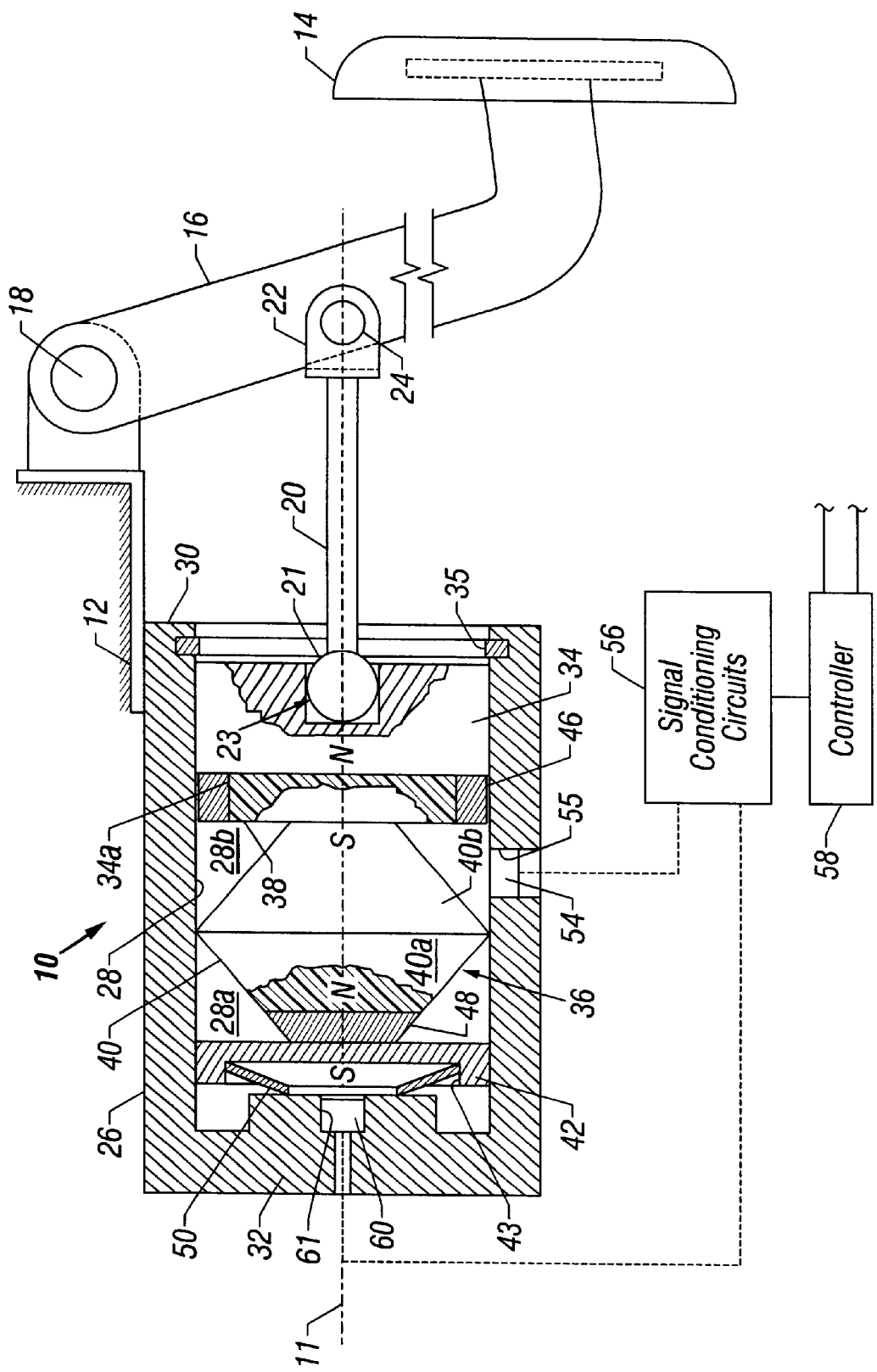

The drawing FIGURE is not intended to be to scale and certain elements and features may be shown in somewhat schematic or generalized form in the interest of clarity and conciseness.

Referring to the drawing figure, a brake pedal feel emulator in accordance with the invention is illustrated and generally designated by the numeral 10. The emulator 10 is shown operably connected to a structural component 12 of a motor vehicle and the vehicle structure also supports an operator controlled brake actuator or brake pedal 14 mounted on an arm or linkage 16 for pivotal movement about a pivot 18. Linkage 16 is connected to an emulator actuating rod 20 which may be connected to the linkage by a suitable connector including a clevis 22 and pivot pin 24, by way of example only.

The emulator 10 includes a housing 26, preferably formed of a nonmagnetic material and having a cylindrical bore 28 formed therein. Bore 28 extends from one end 30 of housing 26, which is open, to an opposite end defined by an end wall 32. A first generally cylindrical piston 34 is disposed in bore 28 and is operably connected to end 21 of actuating rod 20 by a spherical ball and socket type connector 23, as illustrated. Piston 34 is slidably retained in bore 28 by a suitable retaining ring 35.

Piston 34 is engageable with an elastomer spring, generally designated by the numeral 36. The spring 36 comprises an elastomer body including a circular disk part 38 engaged with an end face 34a of piston 34 and formed integral with a second elastomer spring part 40 which is preferably formed as a combination of back to back frustoconical shaped body portions 40a and 40b which are configured to provide at least two annular spaces 28a and 28b within the bore 28. Spaces 28a and 28b are formed between the piston 34 and a second somewhat cup shaped piston 42 slidably disposed in bore 28 between the elastomer spring 36 and endwall 32. The elastomer spring 36 may be impregnated with magnetic material throughout, such as fine ferrous particles, and then polarized to have a "North" and "South" pole arranged generally on and spaced apart along central axis 11 of the emulator 10.

Alternatively, as shown in the drawing figure, a circular ring shaped magnet 46 may be bonded to the disk part 38 of the elastomer spring 36, as illustrated. In all events, spaced apart magnetic poles "N" and "S" are provided by a magnet, as shown, and which generates a somewhat toroidal shaped magnetic field having a central axis coincident with axis 11 and defined by somewhat elliptical shaped flux lines. A second somewhat frustoconical disk shaped magnet 48 is interposed the spring body portion 40a and the piston 42. The magnet 48 is bonded to the spring body portion 40a and has "N" and "S" poles also arranged along axis 11, as shown, to also form a toroidal magnetic field about axis 11.

The emulator 10 further includes a mechanical spring 50 interposed the end wall 32 and the piston 42 and engaged with the piston 42. A Belleville or conical washer spring 50 is illustrated, and is preferred for space and force/deflection considerations, but the configuration of the spring may be otherwise. Piston 42 includes a cylindrical recess 43 for receiving the periphery of the spring 50, as illustrated.

Still further, the emulator 10 includes a first Hall effect sensor 54 mounted on the housing 26 adjacent the elastomer spring 36 for measuring movement of the spring in response to actuation of the brake pedal 14. Hall effect sensor 54 is preferably disposed in a receptacle 55 adjacent housing bore 28 and is operably connected to signal conditioning circuits 56. Circuits 56 are operably connected to a controller 58 for controlling actuation of a brake system, not shown, for a vehicle in connection with which the brake pedal 14 and emulator 10 are used. Still further, the emulator 10 includes a second Hall effect sensor 60 suitably disposed in a receptacle 61 in the end wall 32, along the axis 11 and also operably connected to the signal conditioning circuits 56 for transmitting suitable electrical signals thereto.

The Hall effect sensors 54 and 60 are operable to sense changes in the intensities of the magnetic fields generated by the magnetized or magnet impregnated elastomer spring 36 as the spring is deformed or deflected in response to actuation of the operator controlled brake pedal 14 and the piston 34 by way of the linkage 16 and actuating rod 20. As the piston 34 is moved to the left, viewing the drawing figure, the elastomer spring 36 will deform and the poles of the magnet 46 will also move to the left in such a way that the intensity of the magnetic field generated by the magnet 46 (or a magnet formed by the elastomer spring itself if the elastomer is impregnated with magnetized ferrous particles, as previously discussed) and sensed by the sensor 54 will change. Moreover, the direction of the flux lines generated by the magnet 46, with respect to the sensor 54, may also change.

Accordingly, the Hall effect sensor 54 is operable to generate signals transmitted to the signal conditioning circuits 56 related to the linear travel of the piston 34 and the pedal 14. Although the signal output from the Hall effect sensor 54 may be a nonlinear signal with respect to travel of the piston 34, the signal conditioning circuits 56 are operable to modify the signal in such a way that a signal output to the controller 58 will indicate a linear relationship between movement of the piston 34 and pedal 14, and the signal generated by the sensor 54.

Concomitant with the signal generated by sensor 54, movement of the elastomer spring 36 and deflection or deformation of same will also affect the intensity of the magnetic field imposed on the Hall effect sensor 60 by the magnet 48, including the direction of the flux lines generated by the magnet and intersecting the sensor 60. This action will occur as the piston 42 is moved by the spring 36 against the urging of the spring 50 so that a signal may be generated by the Hall effect sensor 60 which is proportional to the braking effort or force exerted on the brake pedal 14. The signal conditioning circuits 56 are also operable to convert a signal from the Hall effect sensor 60 to a signal indicating the force with which brake pedal 14 is being engaged by the vehicle operator. Accordingly, the emulator 10 provides suitable "feel" for brake pedal movement by a vehicle operator and transmits travel and force signals to controller 58 via the signal conditioning circuits 56 for actuation of brake control circuits, not shown, for applying braking action to the vehicle wheels, for example.

The emulator 10 may be constructed using conventional engineering materials for pedal feel emulators known in the art. The Hall effect sensors 54 and 60 may be of types commercially available. Preferably, the housing 26, the piston 42 and the spring 50 are fabricated of nonmagnetic materials to avoid adversely influencing the direction and intensity of the magnetic fields generated by the elastomer spring 36 including the magnets 46 and 48, or a magnetized spring itself if it is fabricated of a suitable magnetic material, as previously discussed. Moreover, a simplified brake pedal feel emulator is provided which eliminates the requirements for externally mounted or configured force and travel sensors and simplifies the requirements for installation of an emulator and associated signal generating sensors on a vehicle using an electrically controlled brake system.

Although a preferred embodiment of a brake pedal feel emulator and signal generator for a motor vehicle brake system has been described in detail hereinabove, those skilled in the art will recognize that various substitutions and modifications may be made without departing from the scope and spirit of the invention as set forth in the appended claims.

What is claimed is:

1. An emulator for a motor vehicle braking system operably connected to an operator controlled brake actuator for said braking system, said emulator comprising:

a housing including a bore formed therein;

a first piston disposed in said bore for linear reciprocating movement in said bore;

an actuating member adapted to inter connect said first piston with said operator controlled brake actuator;

a first spring disposed in said bore and operably engaged with said first piston;

a first magnet for generating a magnetic field in the vicinity of said housing;

a first sensor mounted on said housing for sensing a change in said magnetic field in response to movement of said operator controlled brake actuator, said first piston and said first spring;

said first sensor being operable to generate a signal related to displacement of said piston and said first spring in response to movement of said operator controlled brake actuator; and a second piston mounted in said bore and operably engaged with said first spring and with a second spring supported in said bore, said second piston being moveable in response to movement of said first piston and against the urging of said second spring, and a second sensor operable to sense a change in a magnetic field in response to movement of said second piston against the urging of said second spring.

2. The emulator set forth in claim 1 wherein:
said first spring comprises an elastomer body.

3. The emulator set forth in claim 2 wherein:
said first magnet comprises a discrete magnet mounted on said elastomer body.

4. An emulator for a motor vehicle braking system operably connected to an operator controlled brake actuator for said braking system, said emulator comprising:

a housing including a bore formed therein;

a first piston disposed in said bore for linear reciprocating movement in said bore;

an actuating member adapted to inter connect said first piston with said operator controlled brake actuator;

a first spring disposed in said bore and operably engaged with said first piston;

a first magnet for generating a magnetic field in the vicinity of said housing;

a first sensor mounted on said housing for sensing a change in said magnetic field in response to movement of said operator controlled brake actuator, said first piston and said first spring;

said first sensor being operable to generate a signal related to displacement of said piston and said first spring in response to movement of said operator controlled brake actuator;

said first spring comprises an elastomer body; and said first magnet comprises magnetic material dispersed throughout at least a part of said elastomer body.

5. An emulator for a motor vehicle braking system operably connected to an operator controlled brake actuator for said braking system, said emulator comprising:

a housing including a bore formed therein;

a first piston disposed in said bore for linear reciprocating movement in said bore;

an actuating member adapted to inter connect said first piston with said operator controlled brake actuator;

a first spring disposed in said bore and operably engaged with said first piston;

a first magnet for generating a magnetic field in the vicinity of said housing;

a first sensor mounted on said housing for sensing a change in said magnetic field in response to movement of said operator controlled brake actuator, said first piston and said first spring;

said first sensor being operable to generate a signal related to displacement of said piston and said first spring in response to movement of said operator controlled brake actuator;

said first spring comprises an elastomer body; and said elastomer body includes opposed body portions disposed in said housing between said first piston and an endwall of said housing and configured to delimit a space in said bore to allow elastic deflection of said elastomer body in response to movement of said first piston.

6. The emulator set forth in claim 1 wherein:

said first sensor comprises a Hall effect sensor.

7. The emulator set forth in claim 1 wherein:

said first sensor is operably connected to a signal conditioning circuit for generating a signal proportional to linear displacement of said first piston in said bore.

8. The emulator set forth in claim 1 including:

a second magnet for generating said magnetic field sensed by said second sensor and interposed said first and second pistons.

9. The emulator set forth in claim 8 wherein:

said second sensor comprises a Hall effect sensor for sensing a change in said magnetic field generated by said second magnet proportional to a force exerted on said emulator.

10. The emulator set forth in claim 8 wherein:

said second sensor is operably connected to a signal conditioning circuit for generating a signal proportional to the force exerted on said emulator by said operator controlled brake actuator.

11. The emulator set forth in claim 8 wherein:

the poles of said magnets are aligned with and spaced apart along a longitudinal central axis of said bore.

12. An emulator for a motor vehicle braking system operably connected to a brake pedal for said braking system, said emulator comprising:

a housing including a bore formed therein;

a first piston disposed in said bore for linear reciprocating movement in said bore;

an actuating member adapted to interconnect said first piston with a brake pedal of said vehicle;

an elastomer spring disposed in said bore and operably engaged with said first piston;

at least one magnet generating a magnetic field in the vicinity of said housing;

a first sensor mounted in said housing for sensing a change in a magnetic field in response to movement of said brake pedal, said first piston and said elastomer spring, said first sensor being operable to generate a signal related to the displacement of said brake pedal;

a second piston mounted in said bore and engaged with said elastomer spring and with a mechanical spring supported in said bore and engaged with a part of said housing, said second piston being moveable in response to movement of said first piston and deflection of said elastomer spring against the urging of said mechanical spring; and a second sensor disposed to sense a change in a magnetic field in response to movement of said elastomer spring and said second piston against the urging of said mechanical spring and to provide a signal related to force exerted on said brake pedal.

13. The emulator set forth in claim 12 wherein:

said magnet comprises two magnets mounted spaced apart on said elastomer spring.

14. An emulator for a motor vehicle braking system operably connected to a brake pedal for said braking system, said emulator comprising:

a housing including a bore formed therein;

a first piston disposed in said bore for linear reciprocating movement in said bore;

an actuating member adapted to interconnect said first piston with a brake pedal of said vehicle;

an elastomer spring disposed in said bore and operably engaged with said first piston;

at least one magnet generating a magnetic field in the vicinity of said housing;

a first sensor mounted in said housing for sensing a change in a magnetic field in response to movement of said brake pedal, said first piston and said elastomer spring, said first sensor being operable to generate a signal related to the displacement of said brake pedal;

a second piston mounted in said bore and engaged with said elastomer spring and with a mechanical spring supported in said bore and engaged with a part of said housing, said second piston being moveable in response to movement of said first piston and deflection of said elastomer spring against the urging of said mechanical spring;

a second sensor disposed to sense a change in a magnetic field in response to movement of said elastomer spring and said second piston against the urging of said mechanical spring and to provide a signal related to force exerted on said brake pedal; and said magnet comprises magnetic material dispersed throughout at least a part of said elastomer spring.

15. The emulator set forth in claim 12 wherein:

said sensors each comprise a Hall effect sensor for sensing a change in a magnetic field generated by said magnet.

16. The emulator set forth in claim 15 wherein:

said sensors are operably connected to signal conditioning circuits for generating signals proportional to the displacement of and force exerted on said emulator by said brake pedal, respectively.

* * * * *